United States Patent [19]

Maher et al.

[11] Patent Number: 5,453,193
[45] Date of Patent: Sep. 26, 1995

[54] STRAINER

[75] Inventors: Colin Maher, Albany; Timothy Sullivan; Salvatore Panarello, both of Queensbury, all of N.Y.

[73] Assignee: Thermo Fibertek Inc., Waltham, MNA

[21] Appl. No.: 177,223

[22] Filed: Jan. 4, 1994

[51] Int. Cl.[6] .......................... B01D 29/90; B01D 29/37; B01D 29/68; B01D 29/86
[52] U.S. Cl. .......................... 210/406; 210/409; 210/413; 210/415; 210/456; 210/497.01; 210/497.3; 209/250; 209/254; 209/268; 209/273; 209/283
[58] Field of Search ...................... 210/406, 409, 210/413, 415, 456, 497.3, 497.01; 209/243, 244, 254, 273, 283, 380, 250

[56] References Cited

U.S. PATENT DOCUMENTS

| | | |
|---|---|---|
| 369,836 | 9/1887 | Blackman . |
| 1,700,925 | 2/1929 | Dezurik . |
| 2,039,573 | 5/1936 | Weber . |
| 2,341,274 | 2/1944 | Hoff . |
| 2,572,869 | 10/1951 | Koonce . |
| 2,582,401 | 1/1952 | Stinson . |
| 2,872,041 | 2/1959 | Fontein . |
| 3,058,591 | 10/1962 | Nakahara . |
| 3,112,263 | 11/1963 | Ellila . |
| 3,259,244 | 7/1966 | Kaljo . |
| 3,420,658 | 1/1969 | Reding . |
| 3,477,571 | 11/1969 | Maag . |
| 3,988,243 | 10/1976 | Huff . |
| 4,042,511 | 8/1977 | Ginaven . |
| 4,053,407 | 10/1977 | Nordengren . |
| 4,079,010 | 3/1978 | Killeen . |
| 4,085,040 | 4/1978 | Egan . |
| 4,120,790 | 10/1978 | Tinker . |
| 4,230,575 | 10/1980 | Lizee . |
| 4,236,998 | 12/1980 | Heys . |
| 4,412,920 | 11/1983 | Bolton . |
| 4,495,065 | 1/1985 | DeReamer . |
| 4,514,300 | 4/1985 | Szczesny . |
| 4,568,461 | 2/1986 | Aaustin . |
| 4,613,432 | 9/1986 | Racine . |
| 4,710,296 | 12/1987 | Connolly . |
| 4,940,535 | 7/1990 | Fisher . |
| 4,961,864 | 10/1990 | Bruke . |
| 5,259,955 | 11/1993 | Bolton . |

FOREIGN PATENT DOCUMENTS

| | | |
|---|---|---|
| 232128 | 1/1987 | European Pat. Off. . |
| 2237688 | 3/1975 | France . |
| 3638371 | 5/1988 | Germany . |
| 85/4340 | 10/1985 | WIPO . |

Primary Examiner—Thomas M. Lithgow
Attorney, Agent, or Firm—Kane, Dalsimer, Sullivan, Kurucz, Levy, Eisele and Richard

[57] ABSTRACT

An improved strainer device has a screen which receives a solid/mixture from a feed container for separation. To insure that an uneven flow of the mixture over the screen does not occur due to, for example, a non-level mounting, inlet rushing or turbulence, a weir structure is provided which raises the water mixture level above the screen by a predetermined height.

7 Claims, 4 Drawing Sheets

5,453,193

STRAINER

FIELD OF THE INVENTION

The present invention relates to an improved screen filter device which is used in separating a mixture for recovering the solids cleaning the liquid and/or thickening the liquid.

BACKGROUND OF THE INVENTION

There presently exists in many industries including papermaking, the need to separate solids from liquids. In this regard, filtering of the liquid provides for a convenient way of providing same. Heretofore as set forth in U.S. Pat. No. 4,412,920, the disclosure of which is incorporated herein by reference, a filtering device is disclosed. This device utilizes a screen having a central opening and a top spray arranged so that the liquid to be filtered flows through the screen. The solids collected are forced along the screen toward a central opening. Thus the separation of the solids from the liquid occurs.

While this device has proven very satisfactory, in certain applications the high volume situations, the solids tend to staple to the screen clogging it. Also if a very fine screen is used a similar problem occurs.

An improvement upon the device shown in the above referenced patent is that set forth in U.S. Pat. No. 5,259,955, the disclosure of which is also incorporated herein by reference. In this latter patent, the performance of the strainer is improved significantly through the application of a vacuum under the screen thereby applying an additional force on the liquid being strained to force it through the screen. To prevent stapling, a high pressure cleansing fluid is directed at the screen at the same time at an angle with the nominal plane or surface of the screen to force the solids strained by the screen to roll towards the center opening before the solids become stapled.

However some problems still exist with the strainers of the type described above. More specifically, the tank supporting the screen and receiving the strained liquid may be tilted slightly which causes an even flow of the liquid/solid mixture onto the screen thus reducing its efficiency. Turbulence in the liquid/solid mixture caused, for example by inlet flow conditions, also may result in an uneven flow.

OBJECTIVES AND SUMMARY OF THE INVENTION

In view of the above, an objective of the present invention is to provide a strainer in which the flow of the solid/liquid mixture onto the screen is evenly distributed peripherally about the screen.

Another objective is to provide an improved strainer wherein the radial component of the liquid/solid mixture is limited to eliminate skipping.

Yet a further objective is to provide a strainer in which turbulence in the input liquid/solid mixture is reduced.

Other objectives and advantages of the invention shall become apparent from the following description.

Briefly an improved strainer constructed in accordance with this invention includes two concentric containers, the outer one feeding a solid/liquid mixture to the inner container and the inner container supporting a screen. The mixture flows onto the screen so that the liquid goes through the screen and the solids, assisted by a shower action, roll toward a central opening. To insure that the mixture flows evenly onto the screen even a weir structure is provided. The weir structure is formed of two concentric walls arranged so that the mixture flows over one wall and under the other before reaching the screen. Also as a result of the weir foundation the flow is substantially solid.

BRIEF DESCRIPTION OF THE DRAWINGS

Thus, by the present invention its objects and advantages will be realized, the description of which should be taken in conjunction with the drawings wherein.

DETAILED DESCRIPTION OF THE INVENTION

Figure 1:
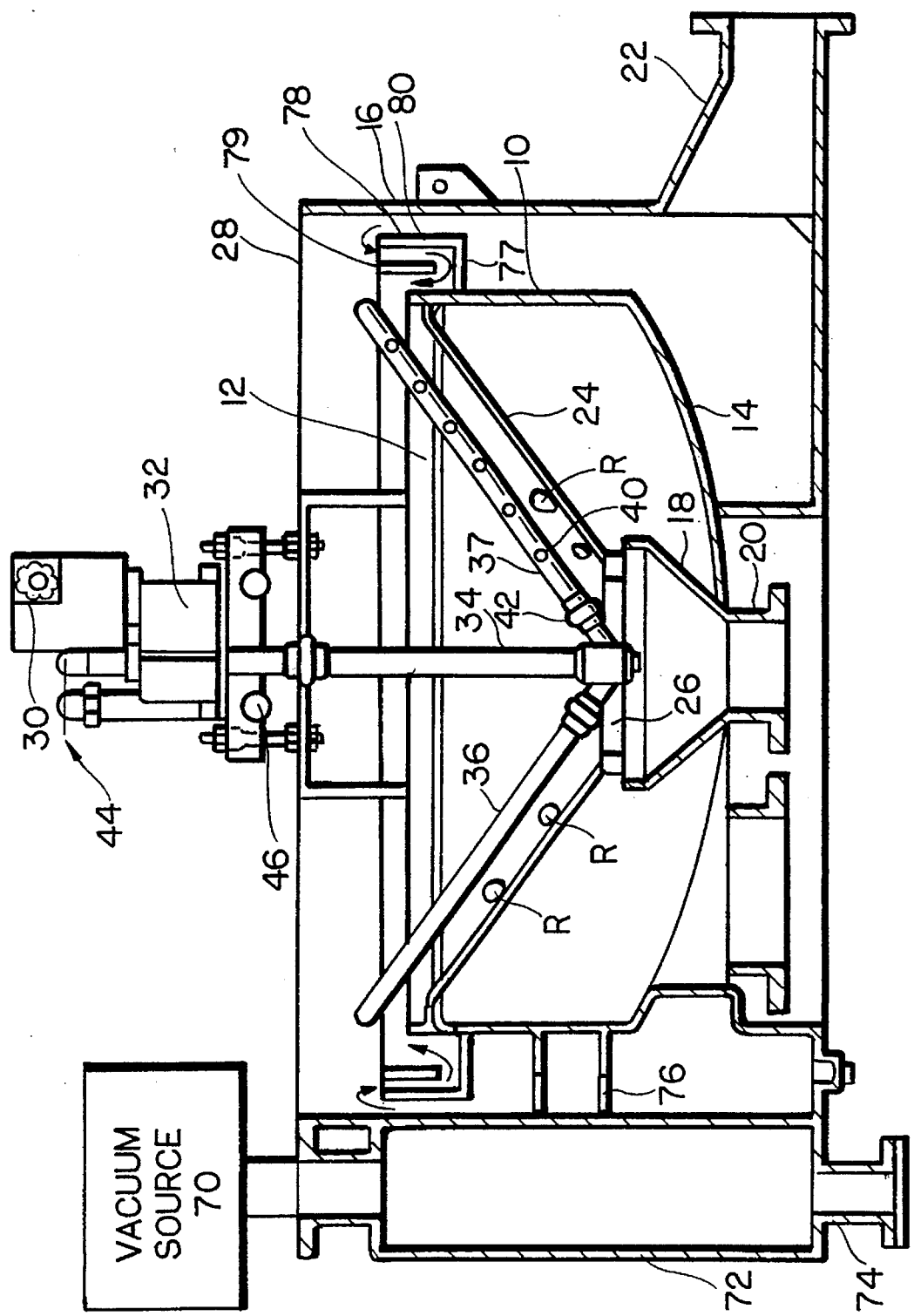
FIG. 1 shows a side sectional view of an improved strainer constructed in accordance with this invention.

In the following description the term mixture shall refer to the material comprised of a mixture of solids and liquids to be strained. The material drained through the screen shall be referred to as a liquid even though it may contain particulate matter, and the material collected from the top of the screen shall be called the concentrate or solids.

The wier device of the subject invention is shown in the Figures and is shown, for example, in association with a cylindrical strainer container 10 having an open top and a bottom 12 and 14 respectively concentrically arranged within feed container 16. A third container 18, also concentrically arranged, is disposed within container 10 with its open top considerably beneath the top of container 10 and its bottom communicating with and arranged to feed into an outlet pipe 20. An inlet pipe 22 is provided for feeding the mixture into feed container 16. A screen 24 extends from the edge of container 10 to the top of container 18. The screen is provided with a circular center opening 26 above container 18. Preferably, the screen is conical so that it is tilted toward opening 26, for example, by about 0°–45°. More particularly, for screening or filtering, a generally low angle maybe used, while for thickening the mixture, generally a steeper angle may be more desirable.

A support structure 28 is provided for feed container 16. Motor 30 and gear reduction box 32 mounted on structure 28 rotate shaft 34 which projects downwardly through the cover. On the end of shaft 34 there are mounted radially disposed spray pipes 36, 37 and 38, angled in parallel with screen 24, which support a series of spray nozzles 40.

Shaft 34, which is hollow, extends upwardly from the gear box to a rotating swivel joint 44. Conduit 46 is provided to supply cleansing water, or other fluid to the spray nozzles 40 via shaft 34 from an outlet shower inlet 42. The nozzles 40 are arranged to direct the spray at an angle to the surface of the screen. The angle may be in the order of 10° to 45° with the screen. The jet from the spray nozzles impinges on the screen at a pressure in the order of 15–20 lbs/sq. in. without vacuum assist or in the range of 50–60 lbs/sq. in. with vacuum assist. At higher pressure spray causes the solids to move along the screen at a much faster speed in a rolling motion, as indicated in FIG. 1 schematically by generally cylindrical shapes R. In this manner, as the spray arms rotate in the solids picked up by the screen 24 are rolled toward the center 26 by the high pressure cleansing liquid from the shower nozzle.

As shown in FIG. 1, the subject filter device also includes a low pressure generating means such as a vacuum source 70 connected to a vertical pipe 72 terminating with a drop leg 74. Source 70 may be a vacuum pump, or other means of producing a vacuum. A smaller pipe 76 connects pipe 72 to the interior of container 10. This arrangement is used to introduce a vacuum in the container, in the order of 1–12" inches of water below ambient pressure.

In order to insure that the mixture from container 16 flows onto screen 24, a weir structure 80 is provided which is arranged annularly about the container 10. As shown in more detail in FIG. 2, the weir structure 80 is composed of two concentric walls 78, 79 disposed between the feed container 16 and the strainer container 10. The outer or weir wall 78 is provided with a plurality of notches 90 as described more fully below. The supporting means for supporting the walls 78, 79 have been omitted from FIG. 2 for the sake of clarity, however they are described below. A bottom wall 77 joins the walls to container 10 such the mixture rising in feed tank 16 flows over wall 78 and its notches 90, under wall 78 and onto the screen.

Figure 2:
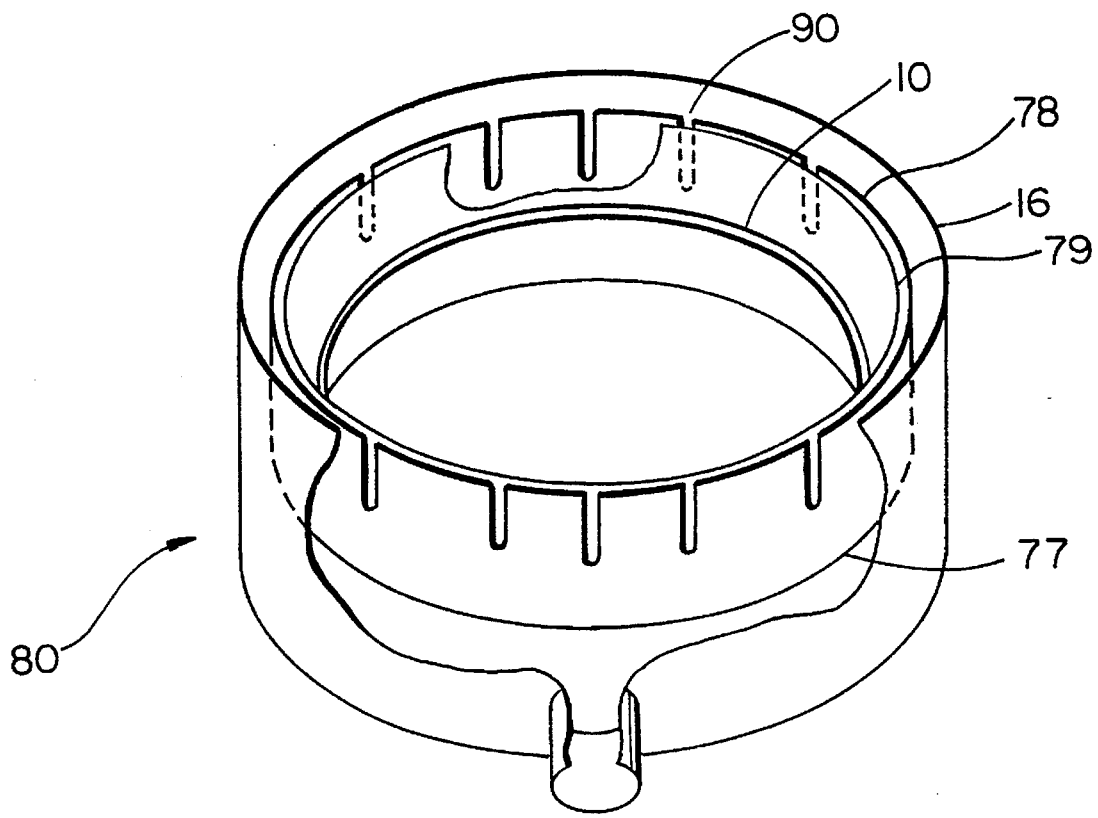
FIG. 2 shows an orthogonal partial sectional view of the strainer of FIG. 1 showing details of the weir.
Figure 3:
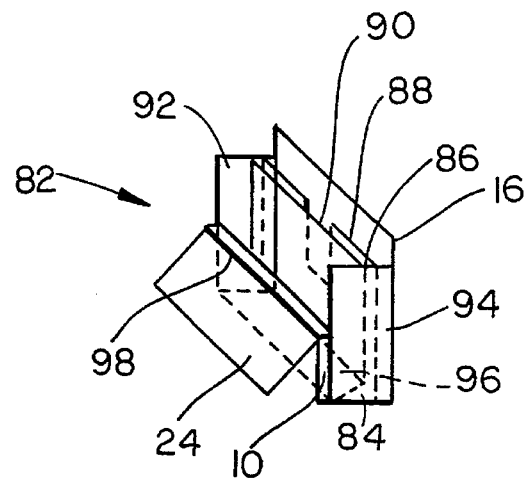
FIG. 3 shows an orthogonal view of a weir segment for the strainer of FIG. 1.

While the weir structure 82 shown in FIG. 3 may be composed of several weir segments such as weir segment 82 preferable it is made of a single piece. The preferred structure is shown in FIG. 2. Weir segment 82 is formed of two arcuate 84, 86 plates arranged concentrically and radially inwardly of the feed container 16. Plate 84 is a weir plate and plate 86 is a deflector plate. Two opposite end walls 92 and 94 are provided. Plate 84 has an upper edge 88 formed with a downwardly extending notch 90. Preferably notch 90 has a rectangular shape but may be shaped differently if suitable for purpose. The two plates 84 and 86 are substantially vertical and extend between containers 10 and 16. The weir segment 82 also has a bottom wall 96 disposed under plate 90 and extend inwardly to container 10. Finally a ledge 98 is provided and rests on the top of container 10 to support weir the segment 82.

Figure 4:
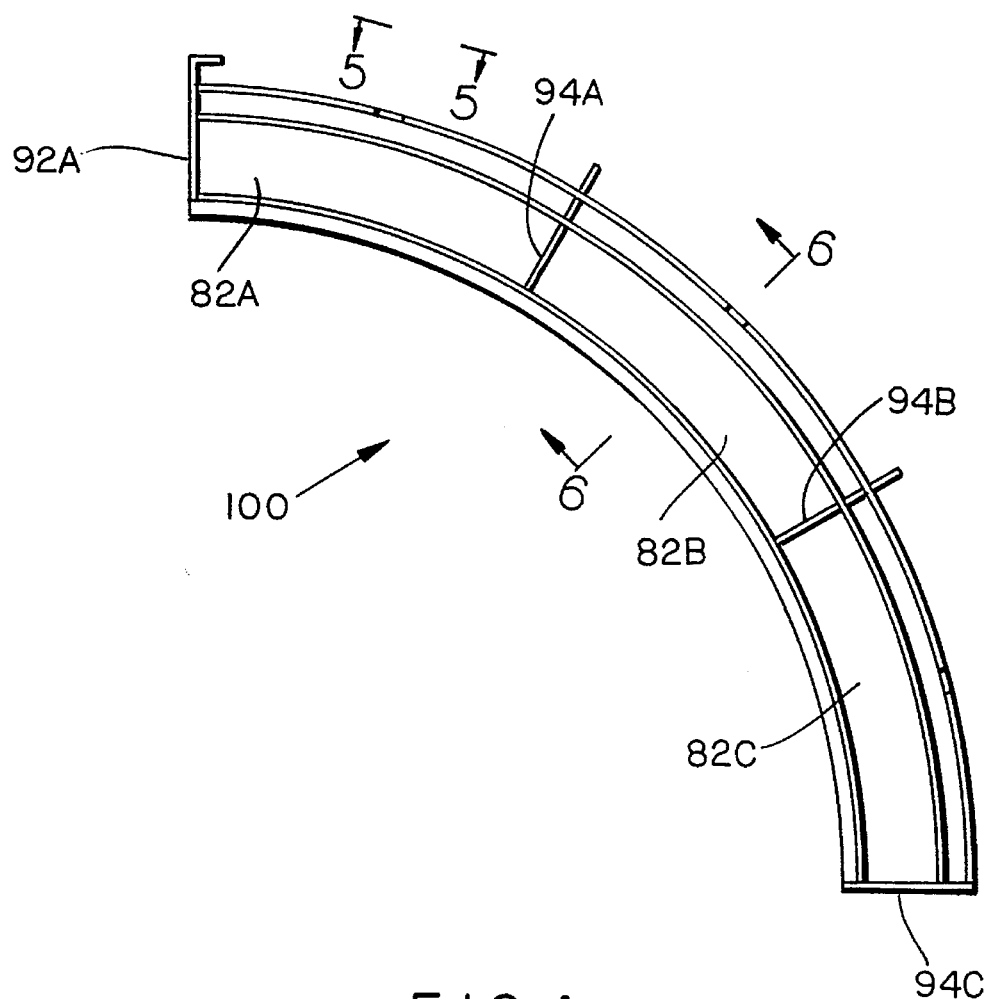
FIG. 4 shows a plan view of a weir division.
Figure 5:
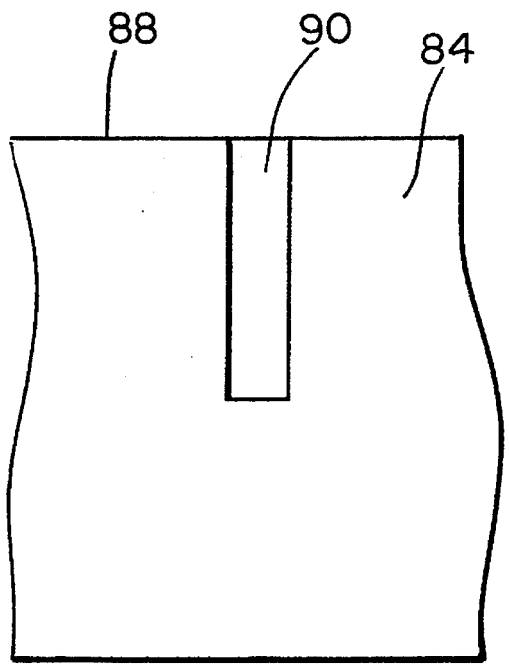
FIG. 5 shows a side sectional view of the division of FIG. 4 taken along lines 5—5.
Figure 6:
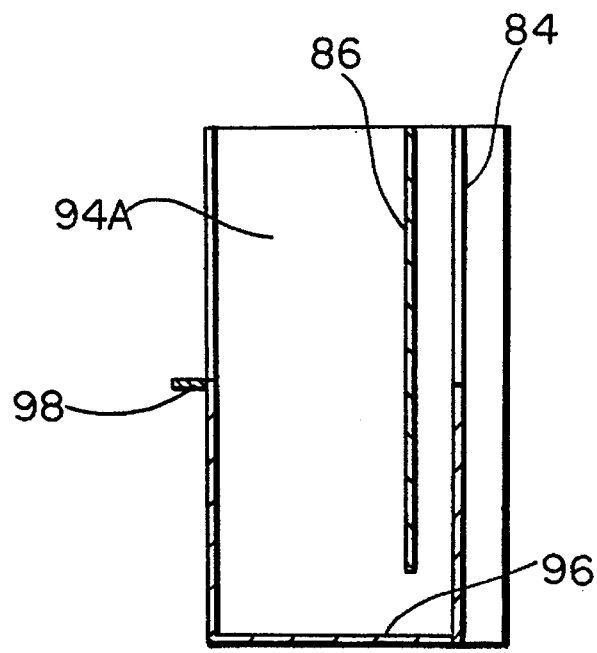
FIG. 6 shows a side sectional view of the division of FIG. 4 taken along lines 6—6.

It has been determined that optimal results are obtained if the radial distance between the weir plate 84 and feed tank 16 is about 1', the notch 90 is about 15" wide by 6" deep, deflection plate 86 is disposed at about 2" above bottom wall 96, and the linear distance between walls 92 and 94 is about 12–15". Plate 84 is about 12" high and plate 86 is about 10" high. Bottom wall is disposed about 6" below the top of strainer container 10. The weir structure 80 can be composed of several weir segments arranged side by side peripherally about strainer container 10. However, it is more economical to construct several segments integrally to form weir divisions. Such division is shown in FIGS. 4–6. In these Figures weir division 100 forms three segments 82A, 82B, 82C each being identical to segment 82 in FIG. 3. The three segments are separated by walls 94A, 94B and have end walls 92A, 94C.

Several weir divisions may then be assembled to form the annular weir structure 80 as shown in FIG. 2. The number of weirs segments required to form a structure of course is determined by the size of the containers. For example, based on the dimensions recited above, for a 48" diameter strainer container 10, a strainer structure 80 can be made of four divisions 100, each defining three weir segments 82 for a total of twelve weir segments. The weir plates 84 of the segments form the wall 78 while the plates 86 form the wall 79 shown in FIG. 2.

The improved strainer operates as follows. The mixture is fed into feed container 16 through pipe 22 and it rises between containers 10 and 16 until it reaches the edge of wall 78. It then flows over the edge and through the notches 90 into the weir structure 80. The weir structure compensates for any offsets in the vertical axis of containers 10 and 16, or from a non-level state, or flow distribution anamolie from any cause. However as the mixture flows into the weir structure it may be turbulent enough and have a sufficiently high radial component to result in an uneven flow across the screen 24. Therefore the bottom wall 77 and the deflector wall 79 cooperate to form a quieting chamber for the mixture. This action may also be assisted by the walls 92, 94.

Within the weir structure 80, the mixture flows under deflector wall 79 and finally rises up to and flows over the screen 24. As the mixture flows over the screen, the liquid passes through the screen while the solids are rolled over toward the screen central opening.

Obviously numerous modifications may be made to this invention without departing from the invention. Thus by the present invention its objects and advantages are realized and although a preferred embodiment has been disclosed and described in detail herein its scope not be limited thereby rather its scope should be determined by that of the appended claims.

We claim:

1. A strainer device comprising a screen having a central opening and being supported by a screen container wall which has an upper edge to define a first over flow edge, a weir wall outwardly radially and concentrically spaced from said screen container wall and having an upper edge located higher than said screen container wall upper edge, said weir wall is formed with openings therein and disposed about said weir wall, a bottom wall connected to the weir wall at a point below the upper edge of the screen container wall at a point below the upper edge of the screen container wall and extending from said weir wall to said screen container wall, a deflector wall located radially outwardly and concentrically with said screen container wall and radially inwardly and concentrically with said weir wall and having an upper edge above the level of the lowest location of the openings and a lower edge spaced upwardly from the bottom wall so as to define a gap between said bottom wall and the lower edge of said deflector wall for a liquid/solid mixture which flows through the openings of said weir wall and then under said deflector wall and then upward and over said screen container wall and a feed container disposed about said screen and at a preselected distance outside both said weir wall and the deflector wall.

2. The strainer device in accordance with claim 1 wherein said device is defined by a plurality of segments.

3. The strainer device of claim 1 further comprising support means for supporting said strainer device.

4. The strainer device of claim 1 wherein said openings comprise notches extending downwardly from the upper edge of the weir wall and disposed equidistantly about said weir wall.

5. The strainer device of claim 1 further comprising radial walls extending radially between said weir and deflector walls.

6. The strainer device of claim 1 wherein said openings comprise at least one notch extending downwardly from the upper edge of the weir wall.

7. The strainer device of claim 6 wherein said notch has a rectangular shape.

* * * * *